Oct. 16, 1928.  
R. H. LANGLEY  
1,687,500  
ELECTRICAL APPARATUS  
Original Filed June 10, 1922    2 Sheets-Sheet 1
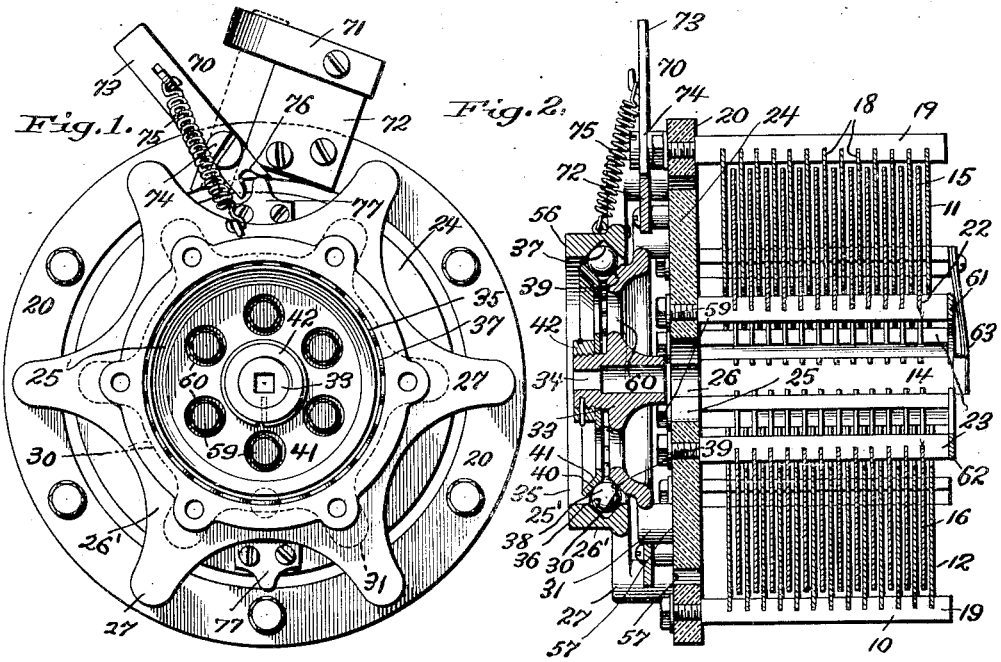
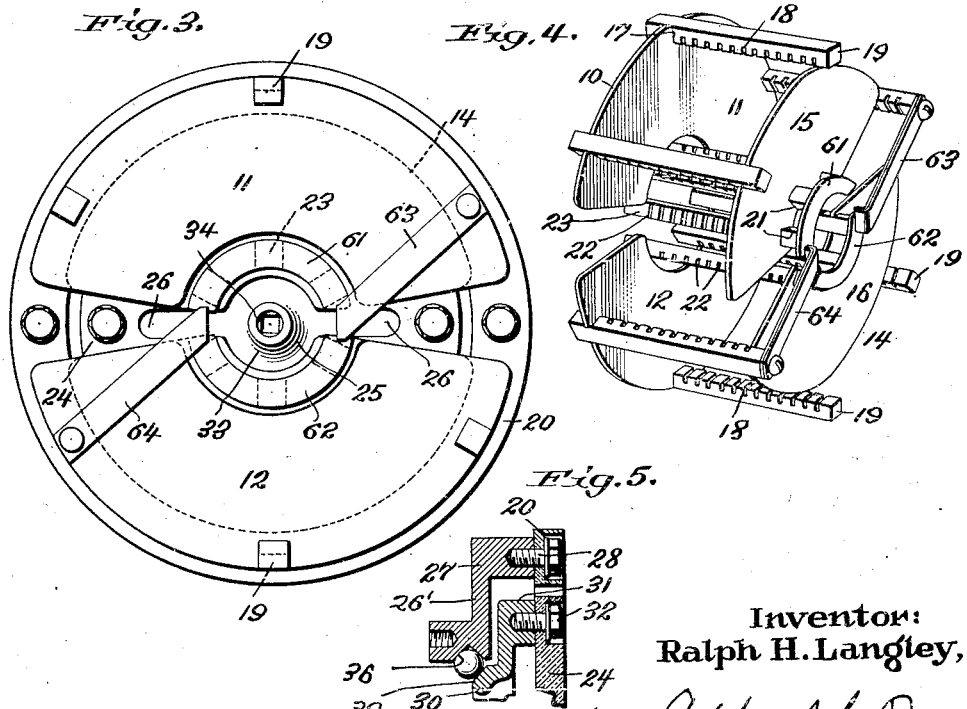
Inventor:  
Ralph H. Langley,  
by His Attorney.

Oct. 16, 1928.

R. H. LANGLEY 1,687,500

ELECTRICAL APPARATUS

Original Filed June 10, 1922    2 Sheets-Sheet 2

Inventor
Ralph H. Langley,
by
His Attorney

Patented Oct. 16, 1928.

1,687,500

UNITED STATES PATENT OFFICE.

RALPH H. LANGLEY, OF SCHENECTADY, NEW YORK, ASSIGNOR TO GENERAL ELECTRIC COMPANY, A CORPORATION OF NEW YORK.

ELECTRICAL APPARATUS.

Application filed June 10, 1922. Serial No. 567,323.

My invention relates to variable condensers and to variable inductance adapted for use in connection with radio apparatus.

Among the objects of my invention are to provide an improved type of variable air condenser provided with means for connecting the condenser with inductance and for varying the amount of inductance thus connected with the condenser.

The invention comprises also switching means which operates in connection with the condenser to interconnect the rotor and stator elements thereof. This last feature of the invention is the subject matter of my copending application No. 152,089, filed December 1, 1926.

Figures 6, 7:
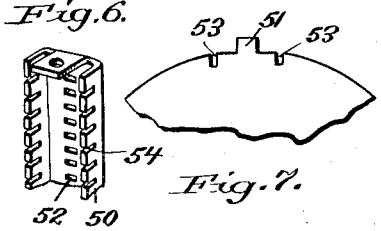

My invention will be more fully understood from the following specification, reference being had to the accompanying drawings wherein Fig. 1 is a plan view of a condenser and switch embodying my invention (the knob for operating the condenser being omitted); Fig. 2 is a central sectional view partly in elevation of the condenser shown in Fig. 1; Fig. 3 is a rear elevation of the structure shown in Fig. 2; Fig. 4 is a fragmentary, perspective view showing the manner in which the stationary and movable plates are supported; Fig. 5 is an enlarged detail showing the manner in which the metal members which form the bearing of the condenser are attached to the insulating supporting plates; Fig. 6 is a perspective view of a modified form of condenser plate supporting post; Fig. 7 is a plan view of a modified form of condenser plate adapted for use with the post shown in Fig. 6; Figs. 8 to 13 inclusive are diagrammatic views of a circuit including the condenser and an inductance, the views showing successive positions assumed by the apparatus throughout its entire range of adjustment, and Fig. 14 is a diagrammatic view showing a modified controlling apparatus.

Referring more particularly to Figs. 2 and 4, my condenser is formed of a stator 10 comprising two groups of stationary plates 11 and 12 and a rotor 14 comprising two groups of movable plates 15 and 16. The stationary plates are formed of sheets of metal having circular outer and inner edges, these edges being formed with notches 17 adapted to cooperate with notches 18 formed at equal distances along supporting posts 19. The posts 19 are secured to an annular supporting member or plate 20 of insulating material. The groups of plates 11 and 12 are arranged upon opposite sides of a central axis and the angle subtended by their combined circular periphery is approximately 320°, thus leaving a space of air insulation between the groups of approximately 20° at each side.

The movable groups of plates 15 and 16 are formed of plates which are similarly shaped to the stationary plates except that their inner and outer diameters are somewhat less. The inner circular edges of the movable plates are formed with notches 21 adapted to cooperate with notches 22 formed on the supporting metal posts 23. The posts 23 are secured to a circular plate 24 of insulating material. This plate is located inside of the space within and some distance from the annular supporting member 20.

The plate 24 is rotatably supported by means of a ball bearing. This bearing is formed of an external metal spider 26' having legs 27 secured by means of inset bolts 28 to the insulating member 20 and an inner metal spider 30 having legs 31 secured to the central plate 24 by inset bolts 32 (see Fig. 5). The inner spider is formed of a hub portion 33 having a central opening 34 adapted to receive a suitable knob or handle (not shown) for rotating the spider. The outer spider 26' is formed with a central opening 35 in the face of which there is formed a groove 36 which constitutes a portion of a ball race. The balls 38 are held between the faces of the groove 36 and inclined face 39 on the spider 30 and a face 40 formed on a member 41, which member is secured to the central portion or hub of the spider 30 by means of a locked nut 42.

It will be noted that the electrical field which would exist between the posts 19 and the bolts 23 must either cross the air gap between the plate 24 and annular member 20 or must pass from the posts 19 to the legs of the outer spider and from the legs of the inner spider to the bolts 23. It is clear that this latter path is of considerable length and the former while somewhat shorter extends across a substantial air gap. This results in a material reduction in electric losses which occur in the insulation and permits the use of such insulating compound as bakelite which otherwise would be but poorly suited for the purpose.

In the manufacture of condensers of this type the plates of the stator group, as well as those of the rotor, should be maintained parallel and equidistant from one another. The movable plate should be located as near as possible halfway between the stationary plates. In many of the condensers heretofore manufactured the plates have been held apart by individual spacers. In certain cases the spacers are threaded on supporting shafts and held apart by rings or washers surrounding the shafts. It is clear that any slight deviation in the thickness of the washers or other spacers will be multiplied when taken over an entire group of plates and the misplacement of certain of the plates may therefore be considerable. Because of slight differences which exist in the thickness of the washers it has been the practice in assembling the condensers to select carefully washers of the proper dimensions for each individual condenser. This method of assembling consumes considerable time and adds to the expense of manufacture. According to my invention I avoid the use of the individual spacers and in other respects provide an improved and efficient method of construction. In accordance with this method provision is made whereby notches 18 and 22 of all of the posts are cut at one operation. The post blanks are all held in a clamp and the notches are cut by a gang of saws which have themselves been accurately spaced. The end saws of the gang are arranged to project in advance of the remaining saws so as to cut off the ends of the posts to a definite dimension. It is clear that the saws when once set in place in the cutting machine may be used in the manufacture of a great number of condensers and thus the expense due to the time spent in accurately adjusting the saws is distributed. The conducting plates after assembly on the posts are preferably firmly secured thereto by soldering.

In Figs. 6 and 7 I have shown an alternative construction for the support of the conducting plates wherein the posts are formed of a channel-shaped punching 50 and the plates are formed of sheets which are punched with tongues 51 adapted to be held within slots 52 in the punchings 50 and notches 53 arranged upon opposite sides of the tongues 51, which notches cooperate with notches 54 in the punching 50. After assembly the plates are soldered to the posts as in the former case.

In order to provide for strict parallelism of the interleaved plates and also for the maintenance at all times of a proper distance between the same, the inner faces of the member 20 and the plate 24 from which the posts 19 and 23 extend are formed so as to to lie in a single plane and the groove 36 of the ball race 37 is so formed that the balls 38 will travel in a plane which is parallel to the plane of these faces. To accomplish this the spider 26' which may be roughly formed as a drop-forging or casting, after being drilled and tapped is secured in a chuck and the outer face 56 of the spider and the groove 36 are formed in one operation so that the plane of the outer face 56 and that of the center of the groove 36 are parallel. The two spiders are then assembled with the balls 38 and the member 41 in place and the entire structure bolted to a face plate with the face 56 bearing against the plate. The face plate is provided with suitable means for preventing the relative rotation of the two spiders. The faces of the feet of both spiders are then turned off to a single plane and are drilled and tapped as shown and secured to their corresponding members 20 and 24. A light cut is then taken across the inner faces of the plate 24 and member 20 so as to cause these two faces to lie in a common plane. The groups of rotor and stator plates are then assembled and the posts 23 are bolted to plate 20 by bolts 59 which may be inserted through opening 60 formed in the spider 39 and member 41.

To the free ends of the posts 23 an arcuate conducting member or contact 61 and a similar member or contact 62 are secured. Secured to oppositely located posts there are provided brushes 63 and 64 which are arranged to bear against the conducting members 61 and 62 in the manner shown (see Fig. 4). By this means, and upon the movement of the rotor 14 and of the contacts 61 and 62 certain circuit relations are established between the groups of plates which will be more fully described.

Secured to the insulating member 20 and operable from the rotor 14 is a switch 70 which comprises a stationary contact 71 mounted upon an insulating plate 72 which is also secured to the member 20. A movable contact 73 is pivoted at the point 74 and is biased by means of a spring 75 connected at one end to the contact and at the other end to the spider 26' to either open or closed position, depending upon which side of the dead center the spring 75 is acting. The inner end of the plate 72 forms a stop for the contact 73 in its open position. If desired, the spring 75 may be supported at its inner ends in such a manner as to be insulated from the metal spider 26'.

The pivoted contact 73 is formed with a bifurcated inner end 76 which is adapted to cooperate with a lug 77 carried by the rotary plate 24 to move the switch in one direction or the other. A similar lug 77 is fixed to the plate 24 at a point diametrically opposite the first lug. This second lug is adapted to engage the inner end 76 of the contact 73 at one side or the other to arrest the motion of the rotor in either direction.

In Figs. 8 to 13 inclusive I show diagrammatically a radio receiving circuit employing the condenser and switch above described. The groups of the plates of the condenser in these figures are each represented by circular lines for convenience in illustration. In these figures, 80 represents an antenna, 81 an inductance which as shown is grounded at one end, and is formed of two portions 83 and 84; the portion 84 being grounded and the portion 83 connected to one of the brushes 63 or 64 of the condenser; the antenna 80 is connected to the opposite brush; a tap 85 extends from the point at which the sections 83 and 84 of the inductance join, to the switch arm 73. The stationary contact 71 of the switch is grounded, the connections being such that when the switch is closed the portion 84 of the inductance 81 is short-circuited. In case the switch blade 73 is electrically connected to the metallic spiders, the connections should be reversed and the movable contact 73 connected to the ground and the stationary contact 71 to the tap 85 because it has been found generally advisable to ground the metal bearing of the condenser.

The values of inductance and capacity to be used are so chosen that the desired wave length range will be obtained. The portion 83 of inductance must be such as to give the desired minimum wave length with the chosen antenna and with the condenser in minimum position. This value of inductance will give a larger wave length when the condenser is in maximum position. The portions 83 and 84 connected in series must be such as to give a wave length somewhat lower than the wave length last above mentioned with the condenser in minimum position and a desired maximum wave length with the condenser in maximum position.

Figure 8:
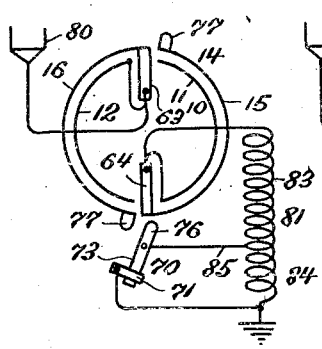

It will be noted that in Fig. 8 the condenser is in the position of minimum capacity, the group of plates 11 and 15 being connected through the brush 64 and the group of plates 12 and 16 being connected through the brush 63. The capacity of the condenser in this position is merely that which exists between the two masses of metal comprising the groups 11 and 14 on the one hand and the groups 12 and 16 on the other.

In Figs. 8 to 13 the rotors are so arranged as to have the capacity increase with clockwise rotation. The contact brushes 63 and 64 are so arranged that when the rotors have turned to the maximum capacity position, a slight further rotation will reverse the connection so as to return the condenser to its minimum capacity. When the rotation is again continued in the same direction the condenser again increases in capacity to its maximum value. The switch 70 is arranged so that it is closed for the first 180° of rotation of the rotor and opened for the second 180°. This means that the portion 84 of the inductance 81 is short circuited for the first 180°, giving the lower wave length range. The switch is opened clockwise and closed counterclockwise by the lug 77.

Fig. 8 shows the circuit at the minimum wave length adjustment. The switch 70 is closed and only the portion 83 of the inductance is in circuit. The capacity is a minimum. Rotation of the movable groups of plates in the counterclockwise direction is prevented by engagement of the lug 77 with the inner end 76 of switch arm 75.

Figure 9:
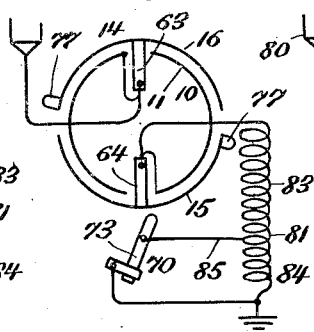

Fig. 9 shows an adjustment of the condenser at the middle point of the lower wave length range at approximately 90° from the position shown in Fig. 8. The groups 15 and 16 of the condenser plates have been advanced clockwise into partial mesh with the groups of opposite polarity and the capacity has been increased to approximately 50% of its maximum value.

Figure 10:
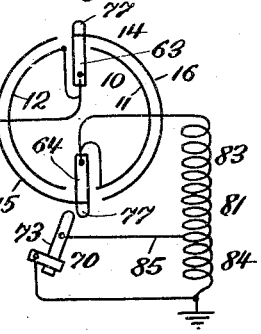

Fig. 10 shows the end of the lower wave length range at about 170°. The groups 15 and 16 have advanced clockwise into complete mesh with the groups of opposite polarity. It is to be noted that within the next few degrees of rotation the lug 77 will strike the switch arm 75 and open the switch. It will also be seen that the brushes 63 and 64 will then make contact with the groups 15 and 16 respectively, instead of with 16 and 15 respectively, thus returning the condenser to its minimum capacity position.

Figure 11:
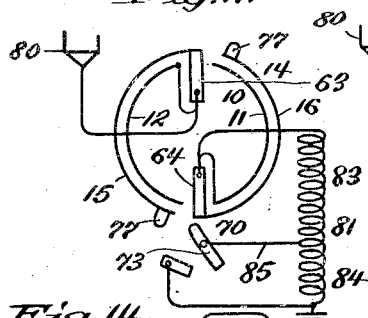

Fig. 11 shows the beginning of the higher wave length range with the rotor displaced from the position shown in Fig. 8 by approximately 190°. Because of the change just made in the connections through the brushes, the capacity of the condenser is at a minimum, the switch 70 has been opened and the entire inductance 81 is now in circuit.

Figure 12:
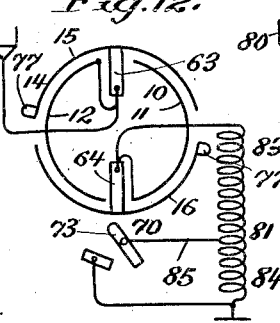

In Fig. 12 is shown the middle position of the higher wave length at about 270°. The rotor groups have again advanced into partial mesh with the stator groups of opposite polarity and the capacity is again increased to approximately 50% of its maximum value.

Figure 13:
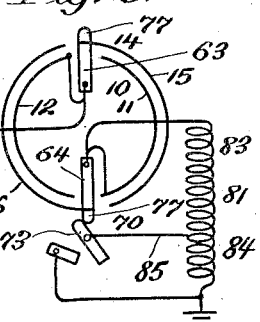
Figure 14:
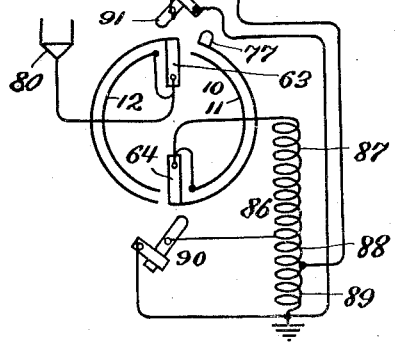

In Fig. 13 the final position giving the maximum wave length is shown wherein the rotor is displaced from the position shown in Fig. 8 by approximately 360°. The groups of the rotor are again in complete mesh with the stator groups of opposite polarity and the capacity is again a maximum. The second lug 77 is about to strike the inner end of the switch arm which will prevent further rotation of the movable groups in a clockwise direction.

It will be noted that upon the reversed movement of the rotor from the position shown in Fig. 13, the cycle will take in a reverse order from that previously described.

In Fig. 14 I have shown an arrangement which permits a still greater variation of wave length without increasing the capacity of the condenser. In this figure the inductance 86 is divided into three groups, 87, 88 and 89, and two switches are provided, 90 and 91, whereby one or both groups may be short circuited. The rotor of the condenser is provided with but one lug 77 instead of the two employed in the apparatus above described. As in the previous case the switches may be moved by the lug in one direction but they will serve as a stop to prevent movement of the lug upon the same coming in contact with switch arm when moving in the opposite direction. It will be noted that with the use of a single lug it is possible to rotate the movable groups of the condenser through 540°, thereby causing the condenser to move from its minimum to its maximum position three times. With both the switches closed, which is their position at starting, as shown in Fig. 14, both portions 88 and 89 of the inductance 86 are short circuited. After 180° of clock-wise rotation, lug 77 opens switch 90, putting the section 88 of the inductance in circuit and after 360° of rotation, the lug 77 opens switch 91, putting the entire inductance into circuit. At 540° the lug strikes the inner end of the arm of the switch 90, thus preventing further movement in that direction. It will also be seen that upon the reversed movement this entire cycle is reversed.

If more than three ranges of wave length are required it is possible to arrange multiple throw switches, the movable arms of which are formed with pins which are adapted to ride in a groove formed in a rotary cam. The groove consists of several 160° circular portions at increasing radii and connected at their ends by 20° cross-over grooves. The circular portions are adapted to hold the switch stationary while the rotor is being turned. The cross-over portions carry the pin on the arm of the switch from one groove to the next and consequently move the switch from one contact to the adjacent contact. This occurs while the rotors are changing their connections by means of the brushes 63 and 64 to change the condenser from its maximum to its minimum position or vice versa.

What I claim as new and desire to secure by Letters Patent of the United States, is:

1. An electrical system comprising an adjustable condenser movable through successive ranges wherein its capacity changes from a minimum to a maximum, a reactance and means operably connected to said condenser for adjusting said reactance at the ends of said ranges.

2. An electrical system comprising an adjustable condenser movable through successive ranges wherein its capacity changes from minimum to maximum, a reactance in series with said condenser, a switch connected to short circuit a portion of said reactance when in closed position and means actuated by said condenser and operable at the end of one of said ranges for opening said switch at the time said condenser passes from its maximum to its minimum.

3. In an electrical system, a condenser having a stator and rotor movable through successive ranges wherein the capacity of said condenser changes from a minimum to a maximum, an impedance, a switch secured to said stator, operating means secured to said rotor for operating said switch at the end of one of said ranges and connections between said impedance and switch whereby said impedance is varied by the operation of said switch.

4. An electrical system comprising an adjustable condenser movable through successive ranges wherein its capacity changes from a minimum to a maximum, an impedance and means operably connected to said condenser for adjusting said impedance at the ends of said ranges.

5. An electrical system comprising an adjustable condenser movable through successive ranges wherein its capacity changes from minimum to maximum, an impedance in series with said condenser, a switch connected to short circuit a portion of said impedance when in closed position and means actuated by said condenser and operable at the end of one of said ranges for opening said switch at the time said condenser passes from its maximum to its minimum.

In witness whereof, I have hereunto set my hand this 9th day of June, 1922.

RALPH H. LANGLEY.